United States Patent Office 3,433,739
Patented Mar. 18, 1969

3,433,739
IRON DEPOSIT PREVENTION
Theodore R. Newman, Oak Lawn, Ill., assignor to Nalco Chemical Company, Chicago, Ill., a corporation of Delaware
No Drawing. Filed Dec. 30, 1966, Ser. No. 606,022
U.S. Cl. 210—58
Int. Cl. C02b 5/06
2 Claims

ABSTRACT OF THE DISCLOSURE

This invention relates to the use of minor amounts of citric acid to stablize water containing dissolved iron, wherein the water is used in once-through systems. Substantially less than equal parts by weight of citric acid have been found to be effective in reducing or preventing iron deposits in waters containing at least 0.5 p.p.m. of iron.

---

Once-through water systems play an important part in the chemical processing industries in the United States. These systems may be defined as systems which take water from a source, pass the water through the equipment and return the water to the source. For example, water may be withdrawn from a river, passed through condensers or heat exchangers, and returned directly to the river. Another form of once-through systems are municipal systems where water is drawn from a lake or other source of water and processed, passed through a main line to ultimate use and returned to a sewer system.

A large portion of the waters employed in once-through systems contains a measurable amount of dissolved or suspended iron. Water containing iron in solution causes unwanted deposit build-up which clogs equipment and necessitates cleaning and/or expensive chemical treatment. Treatment of once-through waters to obviate the deposit formation caused by dissolved iron has heretofore been expensive, since relatively large amounts of chemicals are needed to treat the water. It would be of great advantage to the art if a method could be developed which would require the use of minor amounts of chemicals to reduce or prevent the formation of iron deposits in once-through systems.

Accordingly, it is an object of this invention to provide a process whereby deposits of dissolved iron are prevented.

In accordance with the invention, it has now been discovered that minor amounts of citric acid are effective in preventing iron deposits in waterside surfaces of once-through water systems. Specifically, it has been found that the addition of at least 0.2 part by weight of citric acid per part by weight of iron dissolved in the once-through waters will effectively prevent deposits of iron from being formed on the waterside surface of the once-through system. The invention is admirably suited to any water which is employed in once-through systems, provided that the water contains at least 0.5 p.p.m. of iron.

It is particularly preferred that the residence time of this water being treated according to the process of this invention be less than approximately 1 hour. Systems where the through-put time of the water is substantially greater than about 1 hour may, of course, be treated by the process of this invention, but the effectiveness of the instant invention decreases with increased residence time. To demonstrate the effectiveness of the instant invention, a test procedure was derived. This test procedure consists of the following steps. A standard amount of Chicago tap water is poured into a beaker. To this water is added an amount of stabilizing agent and sufficient amounts of a stock solution of ferrous sulfate to give a 5 p.p.m. (Fe) solution thereof. Within a short period of time, the oxygen entering in the Chicago tap water oxidizes the ferrous sulfate to ferric form and a precipitate is formed. After approximately 30 minutes, the water is filtered through a Millipore filter having a pore diameter of approximately 0.45 microns.

The results of a number of evaluations using the above set forth technique are presented below in Table 1. In each case, the amount of stabilizing agent necessary to substantially prevent deposit, that is, to leave a clean, white filter pad after filtration, was measured. In each case, 5 p.p.m. of Fe as ferrous sulfate was present. It should be pointed out that citric acid was effective as a deposit preventative when only about 2 p.p.m. of this treating agent was employed. A number of other known stabilizing agents were also evaluated, and these results also are presented below in Table 1. In each case, substantially more than a 3 to 1 weight basis of the treating agent was required to achieve substantially complete prevention of iron deposit formation.

TABLE 1

Stabilization evaluation of iron deposits

| Treating agent: | P.p.m. stabilization agent necessary to prevent deposits (5 p.p.m. Fe) |
|---|---|
| Citric acid | 2 |
| Hexametaphosphate | 25 |
| Ethylene diamine tetracetic acid | 40 |
| Nitrilo triacetic acid | 80 |
| Sodium lignosulfonate | 20 |
| Oxalic acid | 30 |
| Malic acid | 13 |

As is evident from the data presented in the above table, only citric acid was suitable in preventing iron deposits when employed in less than a 1 to 1 weight basis. The stoichiometric amount theoretically necessary to react with or chelate all of the iron would be 3.43 p.p.m. of citric acid per p.p.m. of iron. Yet, the above data shows that only 2 p.p.m. of citric acid is necessary to prevent deposits from forming when 5 p.p.m. of iron is present.

By the term "citric acid," it is intended that citric acid as well as the water-soluble salts, such as sodium citrate and the like, be included in the definition. Regardless of the form that the citrate takes as it is added to the water, it is believed that the citrate anion is responsible for the effectiveness of the process of this invention.

What is claimed is:
1. A method for treating water being used in a once-through system to prevent iron deposits on the water-side surfaces of said system, said water containing at least 0.5 p.p.m. of iron, said method comprising the steps of adding at least 0.2 part but less than 1 part by weight of citric acid per part of iron to the water and thereafter flowing said water through the once-through system, thereby preventing iron from forming deposits on said surfaces.
2. The method of claim 1 wherein the residence of said water is less than one hour.

References Cited

UNITED STATES PATENTS
3,150,081   9/1964   Haslam _____ 210—58

REUBEN FRIEDMAN, *Primary Examiner.*
JOHN ADEE, *Assistant Examiner.*